United States Patent [19]

Jasperson

[11] 4,339,332
[45] Jul. 13, 1982

[54] PRESSURIZED CHEMICAL DISPENSER

[76] Inventor: Harold C. Jasperson, 7028 Ironwood, Orlando, Fla. 32808

[21] Appl. No.: 263,129

[22] Filed: May 13, 1981

Related U.S. Application Data

[63] Continuation of Ser. No. 131,084, Mar. 17, 1980, abandoned.

[51] Int. Cl.³ ............................................. B01D 11/02
[52] U.S. Cl. ................................ 210/198.1; 210/169; 210/247; 210/456; 422/278; 422/282
[58] Field of Search ................ 137/268; 210/169, 247, 210/305, 306, 421, 456, 519, 198.1; 422/264, 277, 281–283, 268, 278

[56] References Cited

U.S. PATENT DOCUMENTS

| | | | |
|---|---|---|---|
| 878,280 | 2/1908 | Dehn | 422/264 B |
| 1,205,513 | 11/1916 | Carlson | 422/278 |
| 2,758,877 | 8/1956 | Gleason | 422/278 X |
| 2,767,846 | 10/1956 | Schulse | 422/282 |
| 2,997,373 | 8/1961 | Stephens | 422/282 |
| 3,135,238 | 6/1964 | Eyl | 210/169 X |
| 3,195,985 | 7/1965 | Elkin | 422/282 X |
| 3,266,870 | 8/1966 | Cianflone, Jr. | 422/282 X |
| 3,412,021 | 11/1968 | Paterson | 210/169 X |
| 3,612,080 | 10/1971 | Schneider, Jr. et al. | 137/268 X |
| 3,655,054 | 4/1972 | Pansini | 210/169 |
| 3,672,508 | 6/1972 | Simon | 210/169 X |
| 3,776,274 | 12/1973 | Riley | 137/268 X |
| 3,864,090 | 2/1975 | Richards | 210/169 X |
| 3,867,290 | 2/1975 | Mackey | 210/169 X |
| 3,899,425 | 8/1975 | Lewis | 210/169 X |
| 3,912,627 | 10/1975 | Tepas, Jr. | 422/282 X |
| 3,933,169 | 1/1976 | Halley | 210/169 X |
| 4,056,470 | 11/1977 | Carpenter | 210/169 X |
| 4,115,270 | 9/1978 | Phillips | 210/169 |
| 4,210,624 | 7/1980 | Price | 422/264 |

Primary Examiner—Robert H. Spitzer
Attorney, Agent, or Firm—Duckworth, Allen, Dyer & Pettis

[57] ABSTRACT

The pressurized chemical dispenser of the present invention is coupled to a conduit through which a supply of pressurized fluid is circulating. The system to which the invention is coupled must also include a device coupled in series with the conduit which creates a pressure differential across the input and output sides of the device such that the pressure on the input side exceeds the pressure on the output side. The chemical dispenser includes an offset cavity which is coupled to the conduit on the higher pressure side of the pressure differential device. A fluid tight reservoir stores a supply of fluid soluble chemical and includes an input and an output conduit. The input conduit has a first end which is coupled to the reservoir and a second end which is coupled to the offset cavity. The first end of the output conduit is coupled to the reservoir while a second end is coupled to the fluid conduit on the lower pressure side of the pressure differential device. The pressure differential established across the pressure differential device causes fluid to flow through the offset cavity into the reservoir and then into the lower pressure side of the fluid conduit. The fluid soluble chemical is thus injected at a controlled rate into the fluid.

10 Claims, 6 Drawing Figures

PRESSURIZED CHEMICAL DISPENSER

This is a continuation of application Ser. No. 131,084, filed Mar. 17, 1980, now abandoned.

BACKGROUND OF THE INVENTION

1. Field of the Invention

The present invention relates to pressurized chemical dispensers, and more particularly, to pressurized fluid dispensers which utilize a pressure differential created by the passage of a flowing fluid through a device to dispense a chemical into that fluid.

2. Description of the Prior Art

The prior art discloses numerous types of chemical dispensers which are specifically intended to dispense the chemical chlorine into a swimming pool. U.S. Pat. No. 3,412,021 (Paterson) discloses a chemical injection apparatus which is coupled in parallel with a high pressure water line connecting a water pump to a pool filter unit. The vertically disposed chemical dispenser includes an upper section which is positioned above the water inlet line and which stores undissolved solid chemical. The solid chemical is gradually dispensed from the upper section of the dispenser into the lower section where it is dissolved by the flow of water. The output of the chemical dispenser is coupled to a Tee coupling to the primary high pressure water line which connects directly to the input section on the lower portion of a pool filter unit. The tee coupling includes a suction valve which creates suction in order to maintain a flow of water through the chemical dispenser unit into the pool filter.

U.S. Pat. No. 3,864,090 (Richards) discloses a pressurized chemical injection device which includes a plurality of valves and conduits coupled to the lower portion thereof to divert a portion of the water flowing through a pipe into the chemical injection unit. A restrictor valve is coupled in series with the primary water line. An increase in the restriction produced by this valve creates a higher pressure differential across the chemical dispensing unit and increases increases the rate at which the chemical within the chemical dispenser is dispensed into the water line.

U.S. Pat. No. 3,776,274 (Riley) discloses another pressurized chemical injection unit which utilizes a coaxial tee connector which creates a venturi action in the fluid supply line. This venturi action creates a pressure differential across the input and output lines of the chemical reservoir causing the chemical within the reservoir to be dispensed as desired.

U.S. Pat. No. 3,899,425 (Lewis) discloses a combination filter and automatic chlorinator unit for swimming pools. This device provides a plurality of stand pipes, each of which contain one or more annular filter elements. Water is distributed to each of the stand pipes through one set of pipes and is withdrawn from the interior of the stand pipes by another set of pipes.

U.S. Pat. No. 4,115,270 (Phillips) discloses a percolation type pool chlorination unit which causes water to drip through a powered chemical compound. The dispenser unit must be elevated above the water level in the pool and relies on a gravity feed system.

U.S. Pat. No. 3,933,169 (Halley) discloses a jet action chemical feeding apparatus formed in the shape of a cylinder which includes a hollow tubular chemical pallet which is supported by a centrally positioned rod. A jet of water is directed through the inclined interior of the dispenser and serves to dissolve the chemical at a controlled rate.

U.S. Pat. No. 3,612,080 (Schneider) discloses a chemical dispenser apparatus which includes a housing divided into upper and lower chambers. A float is positioned in the lower chamber and operates valves in response to the level of the liquid in the lower chambers.

U.S. Pat. No. 4,056,470 (Carpenter) discloses an automatic chlorinator which is coupled across the pressure and suction lines of a pool pump. This device includes a float valve assembly which assists in controlling the rate of chemical injection.

Lloyd H. King Enterprises of Hopkins, Minn., manufactures and sells a dispenser for solid chemicals which is inserted in series with a swimming pool high pressure water supply line. A dispenser control unit mechanically displaces a solid chemical pellet vertically downward toward the interior of the main water line in order to control the rate of chemical injection. Chem Control Enterprises of San Gabriel, Calif., manufactures and sells a chemical injection unit for swimming pools which is installed in the water return line. This unit is coupled in series with the water return line by a tee connector. The lower end of the valve assembly is exposed to the flow of return water, causing a flow of water around and over the chemical within the feeder body.

SUMMARY OF THE INVENTION

The present invention contemplates a pressurized chemical dispenser which is used in connection with means for circulating a pressurized fluid through a fluid supply conduit. Pressure differential means is coupled in series with the fluid supply conduit and thereby divides the fluid supply conduit into first and second sections. The pressure differential means includes input and output ports which are coupled respectively to the first and second sections of the fluid supply conduit. The fluid pressure within the first section of the fluid supply conduit exceeds the fluid pressure within the second section of the fluid supply conduit. A fluid filled offset cavity is coupled to the first section of the fluid supply conduit, but does not restrict the flow of fluid through the fluid supply conduit. A fluid tight reservoir stores a supply of a fluid soluble chemical and includes an input conduit and an output conduit. The input conduit includes a first end which is coupled to the reservoir and a second end which is coupled to the offset cavity. The output conduit includes a first end which is coupled to the reservoir and a second end which is coupled to the second section of the fluid supply conduit.

The pressure differential established across the pressure differential means causes fluid to flow from the first section of the fluid supply conduit through the offset cavity into the reservoir and then into the second section of the fluid supply conduit. This pressure differential causes the fluid soluble chemical to be injected at a controlled rate into the fluid.

DESCRIPTION OF THE DRAWINGS

The invention is pointed out in particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, a preferred hardware embodiment of the invention will now be described in some detail.

Figure 1:
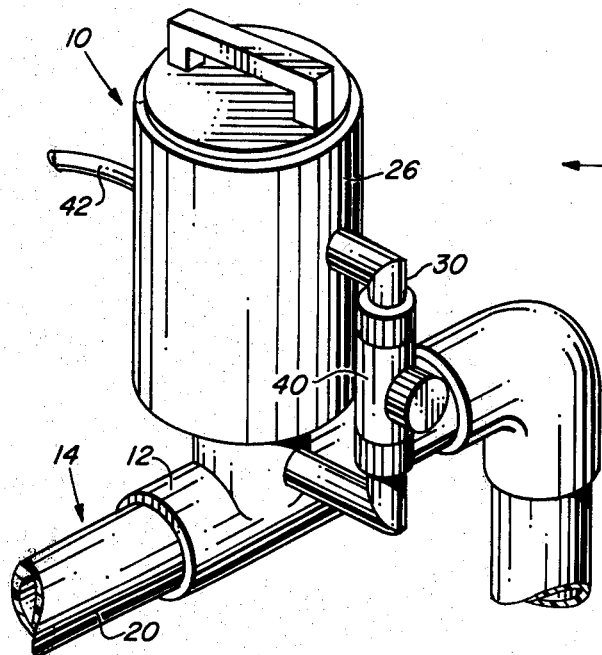
FIG. 1 is a perspective view of one embodiment of the pressurized chemical dispenser of the present invention.
Figure 2:
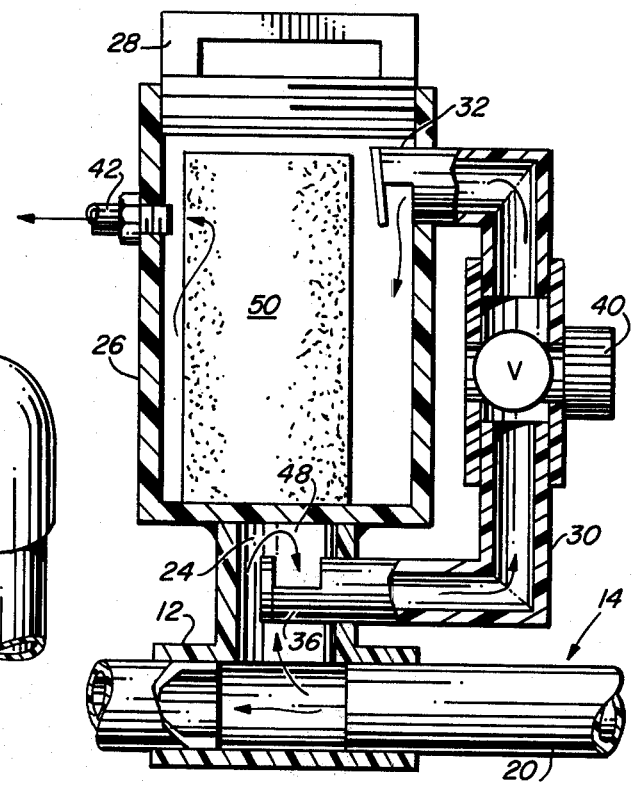
FIG. 2 is a section view of a slightly modified version of the pressurized chemical dispenser illustrated in FIG. 1.
Figure 5:
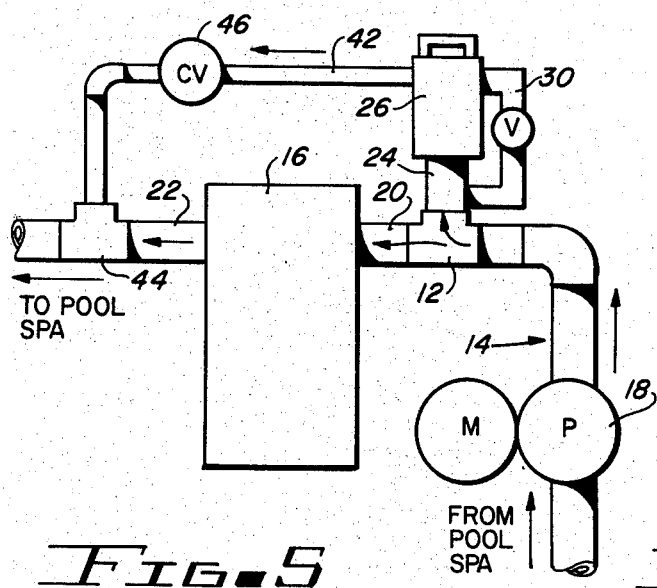
FIG. 5 is a schematic representation of one manner in which the pressurized chemical dispenser can be coupled to a fluid supply conduit.

Referring now to FIGS. 1, 2 and 5, the pressurized chemical dispenser 10 of the present invention includes a tee coupling unit 12 which is coupled in series with a fluid supply conduit 14. In the embodiment illustrated, pressure differential means in the form of a commercially available swimming pool water filter unit 16 is also coupled in series with fluid supply conduit 14 at a point down stream from a motor drive water pump 18 and tee coupling unit 12. Filter unit 16 divides fluid supply conduit 14 into a first section 20 and a second section 22. Since a positive pressure differential is created by the flow of pressurized water through filter unit 16, the pressure on the input side of filter unit 16 exceeds the pressure on the output side. As a result, the water pressure within first section 20 of fluid supply conduit 14 is greater than the pressure within second section 22.

Tee coupling unit 12 includes a fluid filled offset cavity 24. As can best been seen by referring to FIG. 2, neither tee coupling unit 12 nor offset cavity 24 in any way restricts the flow of water through fluid supply conduit 14. Thus, no pressure differential exists across fluid supply conduit 14 at the location where tee coupling unit 12 is attached.

A fluid tight reservoir 26 can be produced in any size or shape and can be fabricated from any one of a number of acceptable materials. In the preferred embodiment of the invention illustrated in FIGS. 1 and 2, reservoir 26 is fabricated from plastic in a cylindrical configuration and has an internal volume of approximately one quart. A cap 28 is threadably coupled to the open upper section of reservoir 26 and includes an o-ring gasket in order to form a water tight seal with reservoir 26. Cap 28 includes a hand grip which facilitates removal and reattachment of the cap when it is necessary to either inspect the unit or replenish the chemical housed within reservoir 26.

Various types of fluid soluble chemicals can be dispensed by the present invention. When the pressurized chemical dispenser is utilized in connection with the chlorination or purification of swimming pool water, generally chlorine or bromine tablets are placed within the interior of reservoir 26. A cylindrical tablet is illustrated in FIG. 2 although chunks or chips of these chemicals function equally well.

Figure 3:
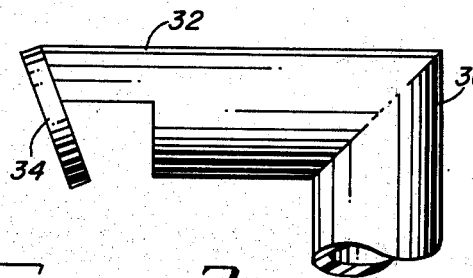
FIG. 3 is partial elevational view of the upper end of the input conduit for the fluid tight reservoir illustrated in FIG. 2.
Figure 4:
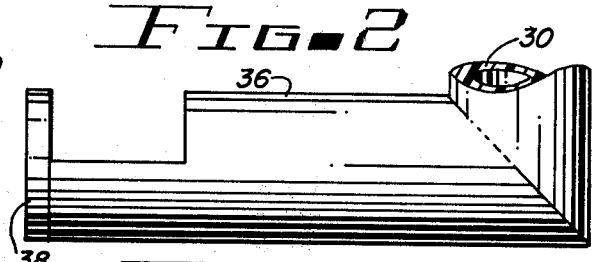
FIG. 4 is a partial elevational view of the lower portion of the input conduit of the fluid tight reservoir illustrated in FIG. 2.

An input conduit 30 is formed in a generally U-shaped configuration as illustrated. FIGS. 3 and 4 best illustrate the configuration of the upper and lower sections of input conduit 30. First end 32 of input conduit 30 passes through an aperture in the side wall of reservoir 26 and includes an angled baffle plate 34 which deflects water passing through input conduit 30 downward toward the lower right hand corner of the interior of reservoir 26. Second end 36 of input conduit 30 extends through an aperture in the side wall of tee coupling unit 12 into the interior of offset cavity 24. A vertically oriented baffle plate 38 is coupled to the end of second end 36. A flow control valve 40 is coupled in series with the mid-section of input conduit 30 and can be manually adjusted to vary the rate of fluid flow through input conduit 30.

An output conduit 42 is coupled to an aperture in the side wall of reservoir 26. This aperture is generally positioned level with or above the aperture in reservoir 26 which receives first end 32 of input conduit 30. The second end of output conduit 42 is coupled to the second section 22 of fluid supply conduit 14 by another tee coupling unit 44. It is not necessary that the outlet of output conduit 42 within tee coupling 44 extend into the flow path of fluid through fluid supply conduit 14 and therefore this outlet neither restricts nor otherwise disturbs the flow of fluid. A one-way check valve 46 may be coupled in series with output conduit 42 to prevent back flow of fluid from second section 22 of fluid supply conduit 14 into reservoir 26. Check valve 46 is not necessary in all installations and therefore may either be omitted or installed as required.

As can be seen, two slightly different embodiments of the pressurized chemical dispenser of the present invention are illustrated in FIGS. 1 and 2. In the FIG. 1 embodiment, input conduit 30 lies in a plane perpendicular to the plane formed by fluid supply conduit 14. Output conduit 42 is positioned at a generally diametrically opposed point to the locations of the upper end 32 of input conduit 30. In FIG. 2, input conduit 30 lies in the same plane as fluid supply conduit 14. While the embodiment illustrated in FIG. 2 may perform somewhat better than the embodiment illustrated in FIG. 1 for the reasons discussed below, certain installations may require the use of the FIG. 1 embodiment to facilitate access to valve 40 to regulate the injection rate of the chemical.

The operation of the present invention will now be explained in some detail primarily by reference to FIGS. 2 and 5. As was described above, the presence of filter 16 creates a pressure differential between first section 20 and second section 22 of fluid supply conduit 14 causing a corresponding pressure differential between tee coupling units 12 and 44. As a result of this pressure differential, a fluid flow path is established in tee connecting unit 12 upward into offset cavity 24. This fluid flow continues its upward movement and then reverses its direction of flow by 180° as indicated by the arrow designated by reference number 48 in order to enter the vertically oriented aperture in the second end 36 of input conduit 30. The flow of fluid continues through the interior of input conduit 30 and is controlled primarily by the magnitude of the pressure differential and restriction created by flow control valve 40. The fluid is expelled from first end 32 of input conduit 30 and is downwardly deflected by baffle plate 34. This downward fluid circulation creates a fluid flow path which assists in dissolving the fluid soluble chemical 50 positioned within the interior of reservoir 26. This circulation continues and causes fluids to pass outward through output conduit 42. The fluid flowing through output conduit 42 includes dissolved chemicals such as chlorine or bromine and is injected under pressure through tee coupling unit 44 into fluid supply conduit 14.

As a result of the unique configuration of offset cavity 24 and the unique configuration of the vertically oriented aperture in the second end 36 of input conduit 30, heavier solid particles of foreign matter such as sand, dirt and related undesirable materials will tend to continue their linear flow path through fluid supply conduit 14 and will pass through tee connector unit 12 without being vertically deflected. Those smaller foreign particles which are slightly deflected upward into offset cavity 24 will under most circumstances not be elevated sufficiently far to permit entry into the vertically oriented aperture in the second end 36 to input conduit 30. Thus, the approximately 270° deflection angle required to permit fluid to enter the vertically oriented aperture in input conduit 30 virtually eliminates the entry of foreign matter into the pressurized chemical dispenser of the present invention and therefore substantially reduces clogging and related maintenance difficulties present in many prior art devices.

The unique operation of the present invention causes a strong purifying chemical such as chlorine to be injected through tee connector unit 44 at a point down stream from all mechanical equipment of the swimming pool system. Thus, high strength chlorine or other corrosive chemical is not injected into the pool filter, valves or pump until it has been injected into the interior of the pool and substantially diluted with the large volumes of water within the pool.

An added benefit is achieved by the structure and operation and the pressurized chemical dispenser of the present invention as a direct result of the fact that the rate of fluid flow through reservoir 26 is directly proportional to the pressure differential across filter unit 16 and is totally unrelated to the rate of fluid flow through fluid supply conduit 14. As filter unit 16 traps and collects particulate matter, the rate of flow through filter unit 16 decreases, but the pressure differential across unit 16 increases. The water in the swimming pool becomes increasingly contaminated with foreign matter as a result of the decreased water circulation rate through filter unit 16 and thus requires a greater amount of purification. This greater amount of purification is achieved by increased flow rates through reservoir 26 produced by the increased pressure differential across filter unit 16.

Figure 6:
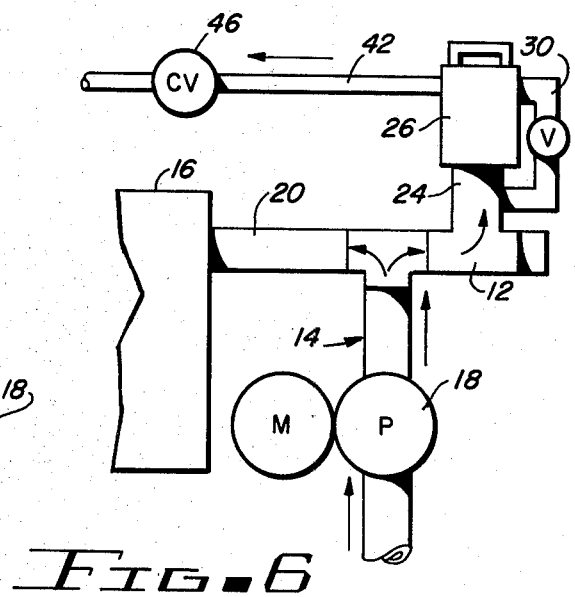
FIG. 6 is a schematic representation illustrating an alternative method of coupling the pressurized chemical dispenser of the present invention to a fluid supply conduit.

An additional advantage of the invention is illustrated by the schematic diagram of FIG. 6. Since the operation of the present invention is a function of the pressure differential across filter unit 16 and not high velocity water flow, tee connector unit 12 can be positioned as illustrated in FIG. 6 at a point through which water does not circulate. The rate of chemical injection produced by the devices in both FIGS. 5 and 6 will be the same since the pressure differential across filter unit 16 will be the same. Numerous other different positions other than the position illustrated in FIG. 6 can produce the same result without deviating from the scope of the present invention. In many instances the physical configuration of the pool pumping and cleaning equipment will dictate the location of tee connector unit 12.

It will be apparent to those skilled in the art that the disclosed pressurized chemical dispenser may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A chlorinator system for use with a source of fluid such as a pool comprising:
   fluid pump means for pumping fluid from the source to an output side;
   a first fluid supply conduit having a first and second end, said first end coupled to the output side of said fluid pump means;
   a filter unit having a filter input side and a filter output side said filter input side coupled to the second end of said first fluid supply conduit;
   a second fluid supply conduit coupled to the output side of said filter unit whereby a pressure differential is created across the filter unit between said first conduit and said second conduit;
   an offset chamber disposed above and coupled to said first fluid supply conduit;
   a first coupler having an orifice on an upper most surface thereof, said first coupler disposed in said offset chamber whereby any fluid flow from said first fluid supply conduit and into said first coupler has a substantial vertical component thereby substantially preventing any non-soluble particles from flowing into the orifice of the first coupler;
   a fluid type reservoir for storing a supply of a fluid soluble chemical, including an intake orifice and an output orifice; and
   means disposed through said input orifice and in communication with said first coupler for creating a circulating flow of fluid inside said fluid type reservoir whereby the circulating flow assists in dissolving the supply of fluid soluble chemical in the fluid type reservoir.

2. The pool chlorinator of claim 2 wherein said means for creating a circulating flow comprises a pipe disposed through a side of the fluid type reservoir, and having an opening at the bottom surface of the end of said pipe; and a baffle plate angularly disposed and connected to the end of said pipe whereby the flow out of the opening is oriented towards the side walls of the fluid type reservoir to create a circulatory flow inside said fluid type reservoir to assist in dissolving the fluid soluable chemical.

3. The pool chlorinator of claim 1 further comprising means disposed intermediate to the means for creating a circulating flow and the first coupler, for controlling the rate of flow of fluid.

4. The pool chlorinator of claim 3 wherein said means for controlling comprises:
   a manually adjustable flow control valve.

5. The pool chlorinator of claim 1 further comprising a tube having one end coupled to the output orifice of the fluid type reservoir, and the other end coupled to said second fluid supply conduit.

6. The chlorinator of claim 1 wherein said fluid type reservoir has an internal volume of approximately one quart.

7. The pool chlorinator of claim 1 wherein said fluid type reservoir comprises:
 a cylindrical member having an open top with an internally threaded top portion;
 a cylindrical cap having an externally threaded portion and having a hand grip thereon whereby said cylindrical cap can be threaded on to the cylindrical member for a water tight seal.

8. The pool chlorinator of claim 7 wherein said fluid type reservoir is made of plastic.

9. The pool chlorinator of claim 1 further comprising a tube having one end coupled to the output orifice of said fluid type reservoir and another end discharging into said source of fluid.

10. The pool chlorinator of claim 5 or 9 further comprising a check valve coupled to said tube.

* * * * *